US011358442B2

(12) United States Patent
Rockelmann et al.

(10) Patent No.: US 11,358,442 B2
(45) Date of Patent: Jun. 14, 2022

(54) ROLLER BLIND ARRANGEMENT COMPRISING A CORRUGATED-TUBE WINDING SHAFT

(71) Applicant: Webasto SE, Stockdorf (DE)

(72) Inventors: Andreas Rockelmann, Stockdorf (DE); Ulrich Schreiber, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/270,708

(22) PCT Filed: Jul. 26, 2019

(86) PCT No.: PCT/EP2019/070188
§ 371 (c)(1),
(2) Date: Feb. 23, 2021

(87) PCT Pub. No.: WO2020/057814
PCT Pub. Date: Mar. 26, 2020

(65) Prior Publication Data
US 2021/0331562 A1 Oct. 28, 2021

(30) Foreign Application Priority Data
Jul. 26, 2019 (DE) ...................... 10 2018 123 280.2

(51) Int. Cl.
*B60J 7/00* (2006.01)
*B60J 1/20* (2006.01)

(52) U.S. Cl.
CPC ............. *B60J 1/205* (2013.01); *B60J 7/0015* (2013.01)

(58) Field of Classification Search
CPC ......... B60J 1/205; B60J 7/0015; B60J 1/2013
(Continued)

(56) References Cited

U.S. PATENT DOCUMENTS 6,062,147 A * 5/2000 Footitt ................... A47B 17/00
108/50.01
10,889,166 B2 * 1/2021 Hiramatsu ............. B60J 1/2033
(Continued)

FOREIGN PATENT DOCUMENTS

CN 108533851 A 9/2019
DE 102005032043 A1 1/2007
(Continued)

OTHER PUBLICATIONS

Tony Rogers, "Everything You Need to Know About Overmolding Prototypes", Aug. 26, 2015, accessed Aug. 24, 2021 from https://www.creativemechanisms.com/blog/overmolding-prototype-design-development (Year: 2015).*
(Continued)

*Primary Examiner* — Johnnie A. Shablack
*Assistant Examiner* — Jeremy C Ramsey
(74) *Attorney, Agent, or Firm* — Fitch, Even, Tabin & Flannery, LLP

(57) ABSTRACT

A roller blind arrangement for a motor vehicle, the roller blind arrangement having a roller blind web and a winding shaft onto which the roller blind web can be wound or from which the roller blind web can be unwound and which has a flexible surrounding-tube arrangement penetrated by a vehicle-attached bearing strut and a corrugated tube as a surrounding-tube element, corrugated-tube ribs being formed on the a corrugated tube and being separated from each other by troughs. The corrugated tube is provided with a coupling overmold at each of its two ends, each coupling overmold being connected to a respective bearing bush and having an outer diameter which corresponds to the maximum outer diameter of the corrugated tube.

6 Claims, 4 Drawing Sheets

(58) Field of Classification Search
USPC .......................................................... 160/262
See application file for complete search history.

(56) References Cited

U.S. PATENT DOCUMENTS

| | | | | |
|---|---|---|---|---|
| 2008/0216970 A1* | 9/2008 | Lin | ........................ | B60J 1/205 |
| | | | | 160/262 |
| 2015/0075732 A1* | 3/2015 | Kirby | ...................... | F16H 1/46 |
| | | | | 160/310 |
| 2021/0129639 A1* | 5/2021 | Rockelmann | .......... | B60J 7/0015 |

FOREIGN PATENT DOCUMENTS

| | | | | |
|---|---|---|---|---|
| DE | 102013102630 A1 | 9/2014 | | |
| DE | 102017119767 A1 | 2/2019 | | |
| EP | 2246517 A1 * | 11/2010 | ............. | F16D 1/101 |
| EP | 2529965 A1 | 12/2012 | | |

OTHER PUBLICATIONS

International Search Report for PCT/EP2019/070188 dated Nov. 13, 2019 in English and German (6 pages).
Written Opinion of the ISA for PCT/EP2019/070188 dated Nov. 13, 2019 in German with English machine translation (7 pages).

* cited by examiner

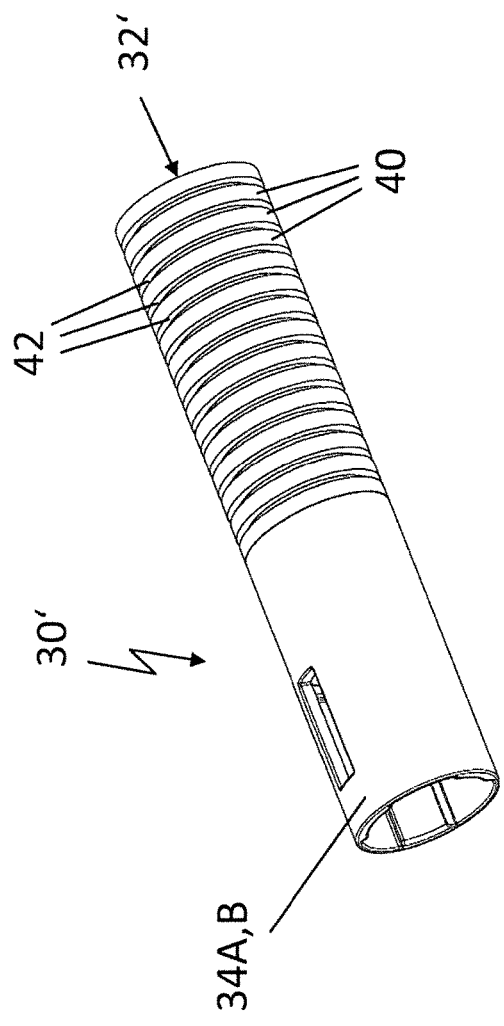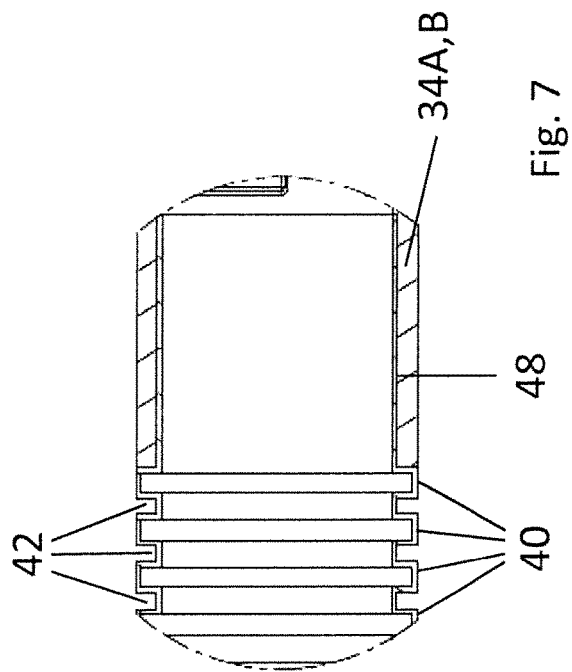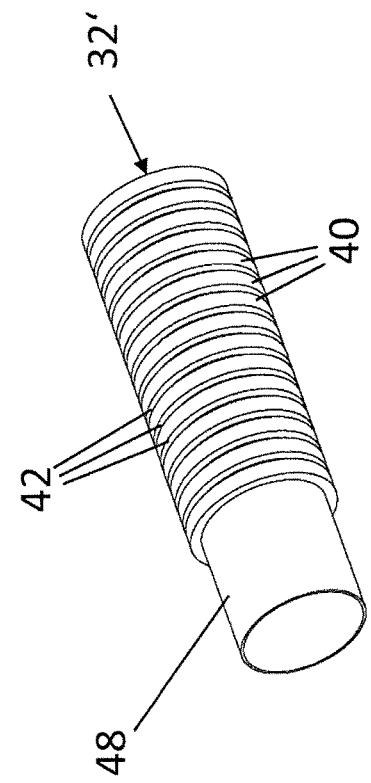

ROLLER BLIND ARRANGEMENT COMPRISING A CORRUGATED-TUBE WINDING SHAFT

CROSS-REFERENCE TO RELATED APPLICATIONS

This application is a U.S. national phase application filed under 35 U.S.C. § 371 of International Application No. PCT/EP2019/070188, filed 26 Jul. 2019, designating the United States, which claims priority from German Patent Application No. 10 2018 123 280.2, filed 21 Sep. 2018, which are hereby incorporated herein by reference in their entirety for all purposes.

FIELD

The invention relates to a roller blind arrangement for a motor vehicle, the roller blind arrangement having the features of the preamble of claim 1.

BACKGROUND

A roller blind arrangement of this kind is known from practice and serves to shade a transparent roof portion of a motor vehicle, for example, which can be formed by a glass lid of a sunroof arrangement or by a solid roof element made of glass. The roller blind arrangement comprises an opaque roller blind web as a shading element which can be wound onto a winding shaft or unwound from the winding shaft in order to shade the transparent roof portion in question. The winding shaft can be curved and comprise, for this purpose, a vehicle-attached curved bearing strut penetrating a flexible surrounding-tube arrangement to which the roller blind web is connected via an edge extending in the transverse direction of the roller blind. The surrounding-tube arrangement comprises a surrounding-tube element which forms a central portion and which is a corrugated tube and which is connected to a bearing bush at each of its ends, the surrounding-tube arrangement being mounted for rotation on the vehicle-attached bearing strut via said bearing bushes. The roller blind web can be provided with a guide tape on each of its edges disposed on either side of a vertical longitudinal center plane of the roller blind, each guide tape being guided in a vehicle-attached guide rail and being attached to one of the bearing bushes. For winding the thus laterally guided roller blind web, the winding shaft comprises a winding spring which pre-loads the surrounding-tube arrangement and the bearing bushes in a winding direction. This ensures that the roller blind web is automatically wound onto the winding shaft when a pull bar attached to the edge of the roller blind web facing away from the winding shaft is released. The known roller blind arrangement presents the problem that the roller blind web cannot be easily guided toward the bearing bushes on the winding shaft in the transverse direction of the roller blind without the resulting roller blind reel exhibiting changes in diameter. However, changes in diameter can lead to uneven tension of the fabric during winding. Also, significant ripples and wrinkles may form in the extended portion of the roller blind web in particular when stiff, multi-layer fabrics are used for the roller blind web. Added felts or additional fabric layers have been used to counteract changes in diameter; however, this complicates the installation process and also leads to higher costs because of the additionally required material.

SUMMARY

The object of the invention is to provide a roller blind arrangement of the kind described above which poses a minimized risk of changes in diameter of the roller blind reel formed on the winding shaft.

According to the invention, this object is attained by the roller blind arrangement having the features of claim 1.

In the roller blind arrangement according to the invention, the corrugated tube, which is preferably made of plastic, is provided with a coupling overmold at each of its two ends, the coupling overmolds allowing the surrounding-tube arrangement to be connected to bearing bushes. The coupling overmolds each have an outer diameter which corresponds to the maximum outer diameter of the corrugated tube. The waves or ribs of the corrugated tube thus have a height or a diameter which corresponds to the outer diameter of the coupling overmolds. Thus, the crests of the ribs are flush with the circumferential surface of the coupling overmold, the circumferential circumference following in particular a cylinder surface. As a result, the roller blind reel formed on the winding shaft or on the surrounding-tube arrangement can be guided smoothly toward the bilaterally disposed bearing bushes without changes in diameter. This risk of ripples or crinkles forming on the roller blind web is thus minimized. The design of the surrounding-tube arrangement as per the invention also eliminates additional material and process costs for measures counteracting changes in diameter. The corrugated tube itself, whose ribs or waves have an outer diameter which corresponds to the outer diameter of the coupling overmold, can be very torsion-resistant. At the same time, the flexing work required when actuating the winding shaft can be reduced. The high torsion resistance leads to little plastic deformation in the area of the surrounding-tube arrangement. The small amount of flexing work leads to reduced hysteresis of a winding spring pre-loading the surrounding-tube arrangement in the winding direction of the roller blind web. This can result in improved function of the roller blind arrangement in particular if long and/or broad roller blind webs are used which are subject to a high spring pre-load.

In a specific embodiment of the roller blind arrangement according to the invention, the corrugated tube has a cylindrical portion at each of its ends, each cylindrical portion being covered by the respective coupling overmold and thus forming the interface for the coupling overmold. The outer diameter of the cylindrical connection ends corresponds in particular to the outer diameter of the corrugated tube in the area of the corrugated-tube troughs and is smaller than that of the corrugated-tube ribs in any case. During production of the corrugated tube by vacuum molding or blow molding, the connecting ends can simply be co-molded if the vacuum mold or the blow mold is shaped accordingly.

To improve the connection of the coupling overmold to the corrugated tube, the corrugated tube has at least one recess in each of its end portions, each recess being filled by the respective coupling overmold, thereby forming an anchorage point for the plastic material of the coupling overmold.

In order for the coupling overmold to be able to flow into corrugated-tube troughs without their outer diameter ultimately exceeding that of the corrugated-tube ribs, the recess runs through at least one corrugated-tube rib in a specific embodiment of the roller blind arrangement according to the invention, the recess and at least one trough of the corrugated tube being filled by the coupling overmold. The recess can be a longitudinal slot or a longitudinal groove.

The recess allows the plastic material of the coupling overmold to flow into at least one of the troughs of the corrugated tube and to spread in the troughs in the circumferential direction. Accordingly, the coupling overmold can also flow into cavities corresponding to the corrugated-tube ribs on the inside of the corrugated tube, ensuring a stable connection of the coupling overmold in question to the corrugated tube.

The recess can be die-cut directly when the corrugated tube is cut to length if the tool is designed accordingly. Thus, only one tool stroke is needed to cut the corrugated tool to length and to form the recess.

In a preferred embodiment of the roller blind arrangement according to the invention, the corrugated tube has two recesses in at least one of its two end portions, the recesses being offset from each other by 180° in relation to the axis of the corrugated tube 180°. These two recesses can also be formed in one stroke when the corrugated tube is cut to length since they are located on top of each other in the die-cutting direction.

Other advantages and advantageous embodiments of the subject matter of the invention are apparent from the description, the drawing and the claims.

BRIEF DESCRIPTIONS OF THE DRAWINGS

Examples of embodiments of roller blind arrangements according to the invention are illustrated in the drawing in a schematically simplified manner and will be explained in more detail in the following description.

FIG. 5 is a perspective view of an end portion of an alternative embodiment of a surrounding-tube arrangement;

FIG. 6 is a perspective view of an end portion of a corrugated tube of the surrounding-tube arrangement of FIG. 5; and FIG. 7 is a longitudinal section through the end portion of the surrounding-tube arrangement of FIG. 5.

DETAILED DESCRIPTION

Figure 1:
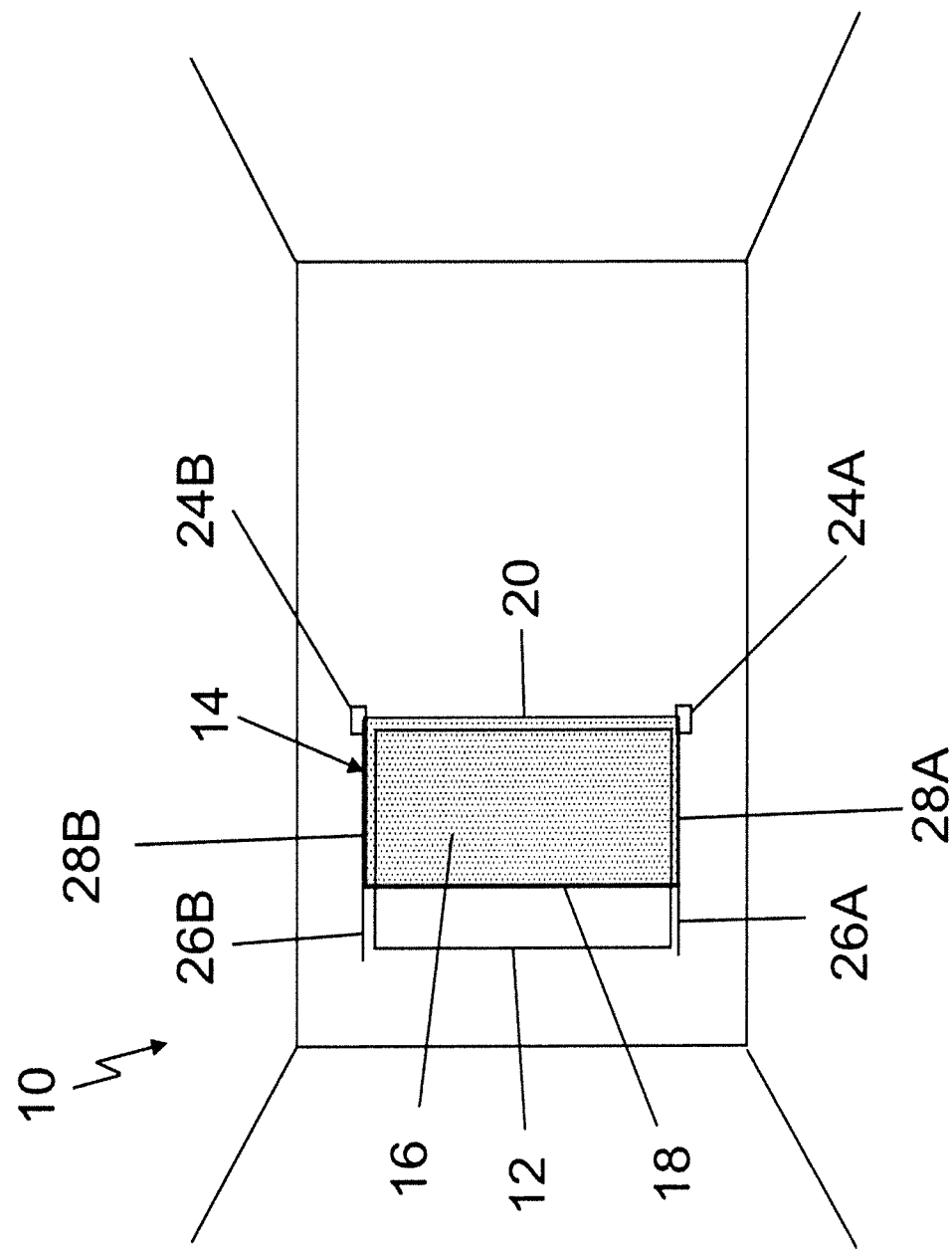
FIG. 1 is a schematic top view of a vehicle roof having a roller blind arrangement according to the invention.

FIG. 1 shows a vehicle roof 10 of a passenger vehicle (not shown), vehicle roof 10 having a roof cut-out 12 which can be closed or at least partially opened by means of a transparent roof element (not shown).

Vehicle roof 10 comprises a roller blind arrangement 14 as a shading element for roof cut-out 12, roller blind arrangement 14 having a roller blind web 16 made of an opaque material which can be folded or wound. Roller blind web 16 is provided with a pull bar 18 at its front edge extending in the transversal direction of the roof, pull bar 18 being an operating element of roller blind arrangement 14. At its edge facing away from pull bar 18, roller blind web 16 is connected to a winding shaft 20 also extending in the transversal direction of the roof.

Figure 2:
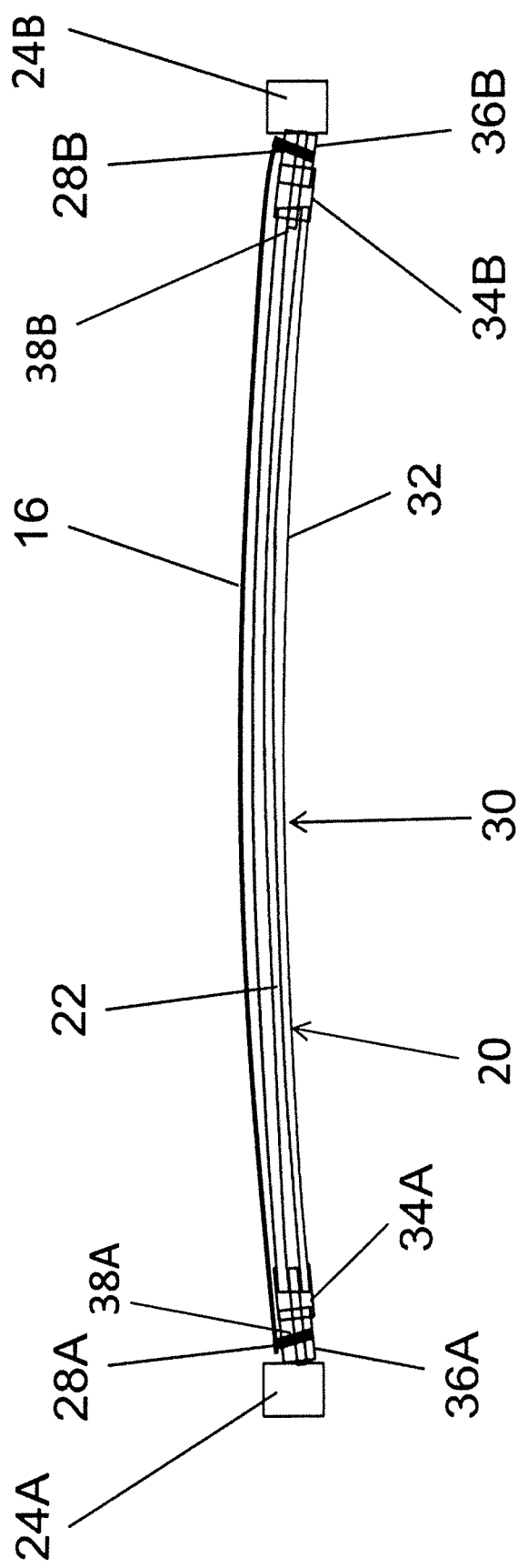
FIG. 2 is a schematic longitudinal section through a winding shaft of the roller blind arrangement.

Winding shaft 20, which is illustrated in more detail in FIG. 2, is curved, thereby following a curvature of vehicle roof 10. This is realized by winding shaft 20 having a curved vehicle-attached bearing strut 22 which is connected to vehicle-attached bearing elements 24A and 24B on either side of a vertical longitudinal center plane of the roof. Bearing elements 24A and 24B are disposed at rear ends of respective guide rails 26A and 26B which extend in the longitudinal direction of the roof, i.e., in the pull-out direction of roller blind web 16, and in which respective lateral edges of roller blind web 16 are guided via guide tapes 28A and 28B.

Winding shaft 20 further comprises a flexible surrounding-tube arrangement 30 penetrated by bearing strut 22. Surrounding-tube arrangement 30 comprises a corrugated tube 32 as a flexible surrounding-tube element, corrugated tube 32 being a vacuum-molded plastic part and being provided with plastic coupling overmolds 34A and 34B at its ends disposed on either side of the vertical longitudinal center plane of the roof. Surrounding-tube arrangement 30 is connected to bearing bushes 36A and 36B via coupling overmolds 34A and 34B on both sides and is thereby mounted for rotation on bearing strut 22 or, more precisely, its bearing journals 38A and 38B, by both ends.

Figure 3:
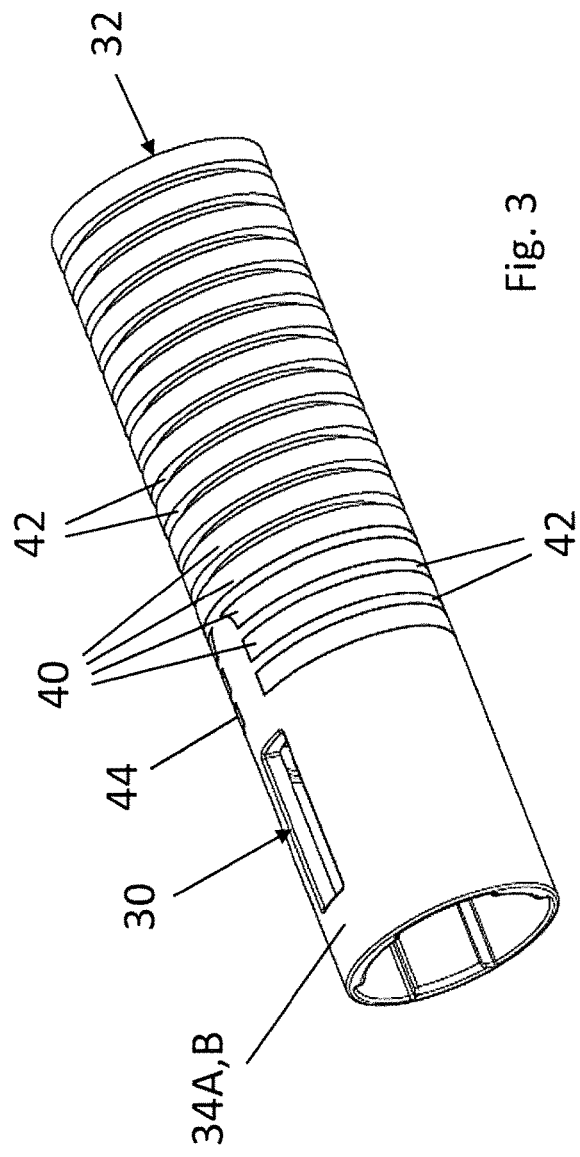
FIG. 3 is a perspective view of an end portion of a surrounding-tube arrangement of the winding shaft.
Figure 4:
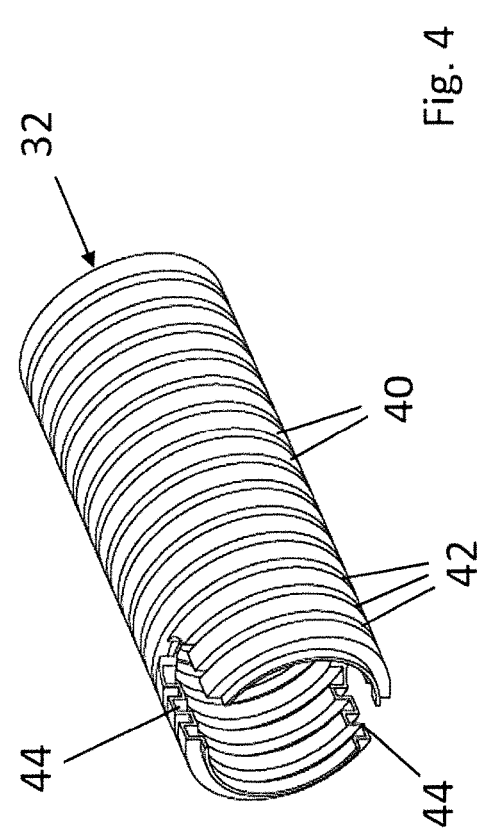
FIG. 4 is a perspective view of an end portion of a corrugated tube of the surrounding-tube arrangement of FIG. 3.

FIGS. 3 and 4 show an end portion of surrounding-tube arrangement 30, the end portion comprising coupling overmold 34A or 34B molded on corrugated tube 32. Corrugated tube 32 comprises a plurality of annular collar-like corrugated-tube ribs 40 across its length, corrugated-tube ribs 40 being separated from each other by troughs 42 and forming a cylindrical ring surface. In its end portions, corrugated tube 32 is provided with two slot-like axial recesses 44 on both sides, recesses 44 being offset from each other by 180° in the circumferential direction and running through three corrugated-tube ribs 40. Coupling overmold 34A or 34B fills recess 44 and the first three troughs 42 adjacent to recess 44. The outer diameter of coupling overmold 34A or 34B corresponds to the outer diameter of corrugated-tube ribs 40, which means that coupling overmold 34A or 34B and adjacent corrugated-tube ribs 40 form a continuous cylinder surface and the roller blind reel of roller blind web 16 on winding shaft 20 can be guided toward bearing bushes 36A and 36B, which are connected for co-rotation to coupling overmolds 34A and 34B, without changes in diameter.

FIGS. 5 to 7 show an alternative embodiment of a surrounding-tube arrangement 30', which differs from the surrounding-tube arrangement of FIGS. 3 and 4 in that it is formed by a corrugated tube 32' whose outermost corrugated-tube ribs 40 in the end portions are adjacent to respective cylindrical portions or connecting ends 48 whose outer diameter corresponds to the outer diameter of corrugated tube 32' in the area of troughs 42. Cylindrical connecting ends 48 are covered by plastic overmolds 34A and 34B, respectively, whose outer diameter corresponds to the outer diameter of corrugated-tube ribs 40. Thus, entire surrounding-tube arrangement 30', like the surrounding-tube arrangement of FIGS. 3 and 4, has a constant outer diameter up to the outermost ends of coupling overmolds 34A and 34B, i.e., except for troughs 42.

The invention claimed is:

1. A roller blind arrangement for a motor vehicle, the roller blind arrangement comprising:
   a roller blind web and
   a winding shaft onto which the roller blind web can be wound or from which the roller blind web can be unwound,
   wherein the winding shaft comprises a flexible surrounding-tube arrangement penetrated by a vehicle-attached bearing strut,
   wherein the flexible surrounding-tube arrangement comprises a surrounding-tube element, wherein the surrounding-tube element is a corrugated tube, wherein corrugated-tube ribs are formed on the corrugated tube and being separated from each other by troughs, wherein the corrugated tube has a coupling overmold at each of its two ends, each coupling overmold being connected to a respective bearing bush and having an outer diameter which corresponds to a maximum outer diameter of the corrugated tube:

wherein the bearing strut is connected to vehicle-attached bearing elements on either side of a vertical longitudinal center plane of a roof; and wherein the surrounding-tube arrangement is mounted for rotation on the vehicle-attached bearing strut via the bearing bushes.

2. The roller blind arrangement according to claim 1, wherein the corrugated tube has a cylindrical portion at each of its ends, each cylindrical portion being covered by the respective coupling overmold.

3. The roller blind arrangement according to claim 1, wherein the corrugated tube has at least one recess in each of its two ends, each at least one recess being filled by the respective coupling overmold.

4. The roller blind arrangement according to claim 3, wherein each at least one recess runs through at least one corrugated-tube rib, each at least one recess and at least one trough of the corrugated tube being filled by the coupling overmold.

5. The roller blind arrangement according to claim 3, wherein each at least one recess is a longitudinal slot or a longitudinal groove.

6. The roller blind arrangement according to claim 3, wherein the corrugated tube has two recesses in at least one of its two ends, the recesses being offset from each other by 180 degrees in relation to the axis of the corrugated tube.

\* \* \* \* \*